United States Patent [19]

Hurtig et al.

[11] 4,262,860

[45] Apr. 21, 1981

[54] TAPE CARTRIDGE WITH INCREASED TAPE CAPACITY

[75] Inventors: Roy E. Hurtig, Saratoga; Bert R. Larson, San Jose; Steven D. Smith, Sunnyvale, all of Calif.

[73] Assignee: Verbatim Corporation, Sunnyvale, Calif.

[21] Appl. No.: 82,558

[22] Filed: Oct. 9, 1979

[51] Int. Cl.³ .......................... G03B 1/04; G11B 15/32
[52] U.S. Cl. .................................... 242/192; 360/96.1
[58] Field of Search .............. 242/192, 196, 200, 210; 360/92, 96; 226/108, 188, 190, 195

[56] References Cited

U.S. PATENT DOCUMENTS

| | | | |
|---|---|---|---|
| 2,743,878 | 5/1956 | Masterson | 242/192 |
| 3,125,311 | 3/1964 | Willis | 242/192 |
| 3,625,456 | 12/1971 | Hankins | 242/192 |
| 4,198,013 | 4/1980 | Anglin et al. | 242/192 |

*Primary Examiner*—Leonard D. Christian
*Attorney, Agent, or Firm*—Thomas E. Schatzel

[57] ABSTRACT

An improved tape cartridge with length dimension significantly greater than prior art cartridges of similar application, tape packs and drive belt being disposed to permit tape packs of greatly increased tape capacity and thereby a multifold increase in total cartridge capacity, and the front face being compatible for interfacing with most commercially available cartridge tape drives.

30 Claims, 5 Drawing Figures

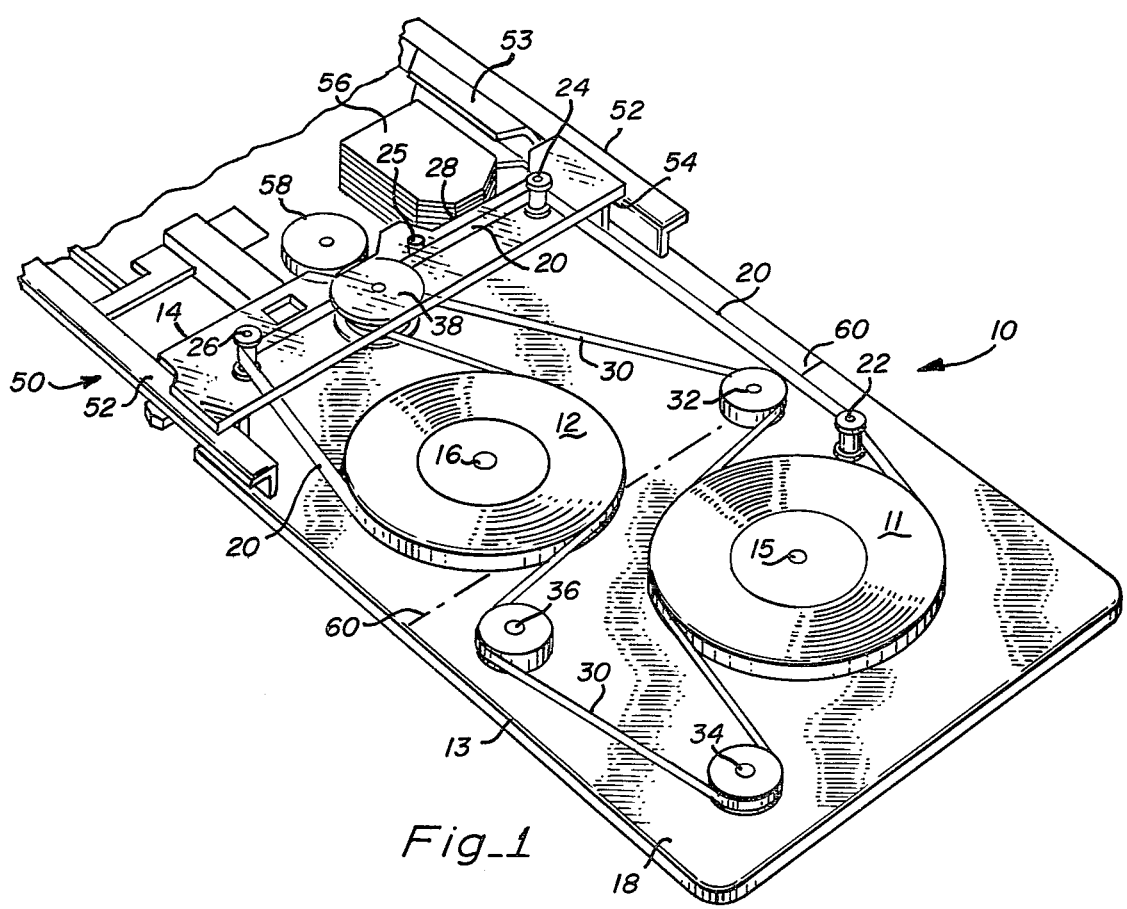
Fig_1

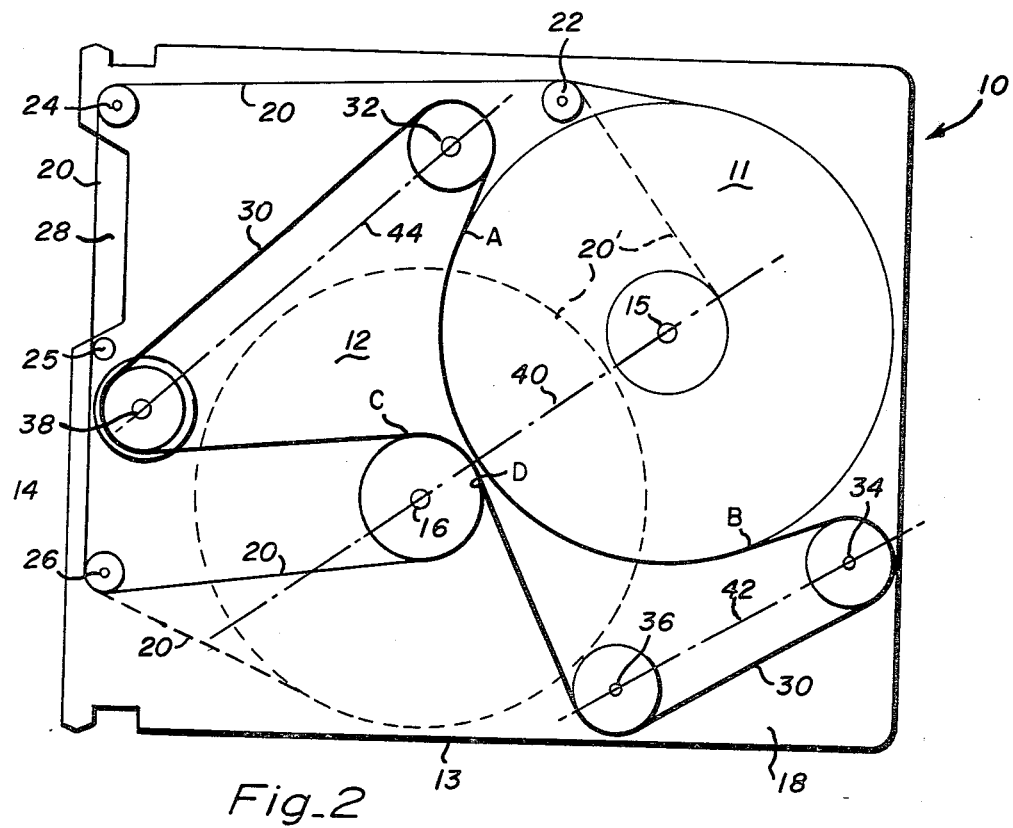
Fig_2
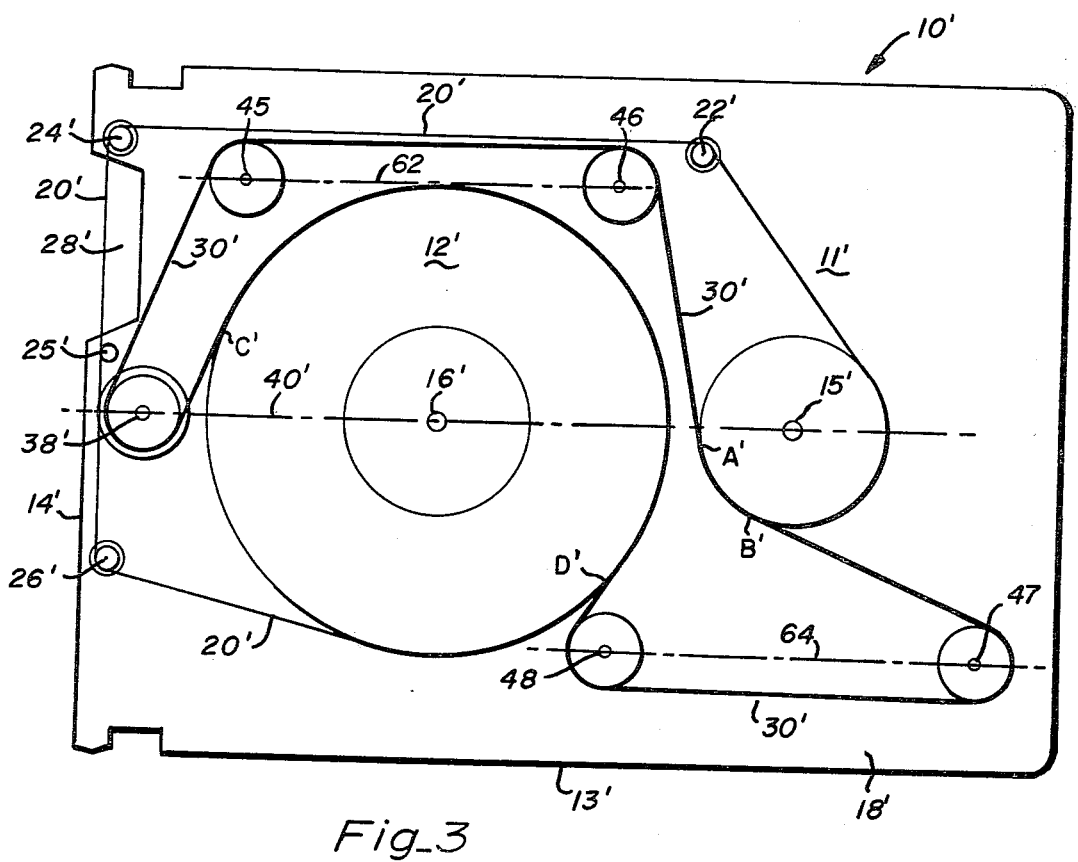
Fig_3

TAPE CARTRIDGE WITH INCREASED TAPE CAPACITY

BACKGROUND OF THE INVENTION

1. Field of the Invention

The invention relates to tape cartridges adapted for the magnetic recording of information and more particularly to an improved cartridge of increased tape capacity.

2. Description of the Prior Art

For many years, magnetic recording tape has been utilized as an inexpensive and reliable medium for the storage and retrieval of data processing information. It has become the practice that for small scale applications, tape cassettes and tape cartridges have proven to be successful vehicles for easy loading for the magnetic tape onto a suitably adapted tape drive. Moreover, said cassettes and cartridges protect the magnetic recording tape from contamination and/or inadvertent contact during operation within the tape drive as well as during storage outside of the tape drive. Such wide acceptance has been received for tape cassettes and tape cartridges that standard configurations have been adopted by the data processing industry.

One such data tape cartridge which has received wide industry acceptance and customer usage is a cartridge similar to that disclosed in U.S. Pat. No. 3,693,255 to Von Behren. The Von Behren patent discloses a tape cartridge wherein two packs, having magnetic recording tape wound therebetween, are driven by an elastic belt disposed for contact with said reels with said belt being driven by a driving roller. Various manufacturers of tape cartridges and tape drives have adopted a configuration similar to the Von Behren patent as a standard configuration. Also, the cartridge-drive interface opening within various commercially available tape drives has been adapted for receipt of the standard cartridge. This standard configuration is expressed in ANSI (American National Standards Institute) specification X3.55-1977 [Unrecorded Magnetic Tape Cartridge for Information Exchange, 0.025 (0.30 mm), 1600 bpi (63 bpmm), phase encoded]. Thus, manufacturers wishing to market a tape cartridge for such a tape drive must do so with cartridge compatibility as a primary design consideration. However, adoption of a standard cartridge configuration creates a common problem in the data processing industry. The problem centers around increasing the tape capacity within the physical constraints of the cartridge compatibility. This can be a most difficult task.

Another tape cartridge which has received industry acceptance is similar to that disclosed by U.S. Pat. No. 3,907,230 to Merle et al. Merle et al describes a tape cartridge that has become known in the art as a "flowing roller" cartridge. In a so-called floating roller cartridge, the tape is driven by an endless elastic belt which moves without slippage in contact with the two tape packs of the cartridge (a take-up pack and a supply pack). The belt is disposed about two rollers, a driven roller and a floating roller. The driven roller is rotatably mounted to a fixed pivot within the cartridge adapted to receive rotation from a driving member located within a cartridge tape drive which is appropriately designed to receive said floating roller cartridge. The position of the floating roller within the tape cartridge is determined by the amount of tape wound on each respective tape pack because the elastic belt captures the floating roller urging it into intimate contact with each tape pack. In this manner, the belt makes contact with each tape pack over some predetermined angle of wrap permitting reliable, nonslip drive. However, floating roller tape cartridges of the prior art suffer from the same practical problem as the Von Behren tape cartridge to the extent that as a tape cartridge design becomes standardized with respect to a cartridge tape drive interface, increasing the storage capacity of the tape cartridge is severely constrained.

In order to increase the tape capacity of a cartridge of a configuration similar to that disclosed in the Von Behren and Merle et al patents, some increase in length of tape wound between the two hubs may be obtained by decreasing the thickness of said tape or reducing the diameter of the hubs. In this manner, it has been possible in some instances to increase the tape capacity of a standard cartridge by approximately 100%. Other than the method of winding more tape of decreased thickness upon the or reducing the diameter of the hubs, no other techniques are known in the prior art for increasing the capacity of a magnetic tape cartridge while maintaining the cartridge/drive standard interface.

SUMMARY OF THE INVENTION

It is an object of the present invention to provide a data cartridge which will interface with the standard tape drive adapted for standard cartridges while providing a multiple-fold increase in cartridge tape storage capacity.

It is another object of the invention to provide a means whereby the storage capacity of tape cartridges may be significantly increased while tape drive/cartridge compatibility is maintained.

It is yet another object of the present invention to provide a means whereby the increase in tape storage capacity for said data cartridges is both relatively inexpensive and easy to implement in manufacturing.

Briefly, a preferred embodiment of the present invention provides a cartridge wherein the geometry and configuration defining the interface between said cartridge and the tape drive have been maintained (i.e., the depth and width configurations), but the external length of the cartridge has been extended to accommodate internal designs for increased tape capacity. The hubs upon which the tape is wound are disposed so that the axis of one hub is physically located closer to the tape/head interface than the other hub. An additional guide roller is employed over the standard cartridge of the prior art so that the tape may accurately pass from one pack across the magnetic recording head to the other pack. In addition, an elastic belt is wound about four rollers in a unique pattern. One roller is located in a manner similar to the prior art at the frontal face of the data cartridge for the purposes of imparting motion to the tape. The other three rollers (an additional roller is utilized over the three roller configuration of the standard prior art tape cartridge) are disposed within the tape cartridge so that the elastic belt wraps partially around both the supply and take-up packs to provide slip-free motion of said packs. The angle of wrap of the elastic belt member stretched around each pack is a function of the length of tape wound thereon. By utilizing the cartridge of the present invention, approximately a three-fold increase in capacity over a standard data cartridge of the prior art may be realized.

In addition, alternative embodiments of the present invention are disclosed. A first alternative embodiment disposes the tape packs so that a straight line drawn through the axis of rotation of the two tape packs makes a perpendicular with the frontal tape of the tape cartridge which makes contact with the tape reproducing and recording head. Said first alternative embodiment utilizes a fifth roller over which the drive belt is guided. A second alternative embodiment utilizes a floating roller captured by the drive belt between the two tape packs. In said second alternative embodiment the drive belt is wrapped about the driven roller which makes contact with a driving roller within the tape cartridge drive, a guiding roller, and the floating roller. In this manner, the floating roller is used in lieu of two stationary rollers. In a third alternative embodiment, a line drawn through the axis of rotation of said tape packs makes a perpendicular with the frontal face of the tape cartridge, but this embodiment includes the use of a floating roller about which the drive belt is wrapped.

An advantage of the present invention is that it provides an improved tape cartridge having significantly increased tape storage capacity while maintaining the critical interface between the magnetic recording head of the tape drive and the tape cartridge.

These and other objects and advantages of the present invention will no doubt become apparent to those skilled in the art after having read the following detailed description of the preferred embodiment which is illustrated in the drawings.

IN THE DRAWINGS

FIG. 1 is a perspective view of a tape cartridge of the present invention with the top plate removed;

FIG. 2 is a plan view of the cartridge of FIG. 1;

FIG. 3 is a plan view of an alternative embodiment of the cartridge of the present invention;

DESCRIPTION OF THE PREFERRED EMBODIMENT

Figure 4:
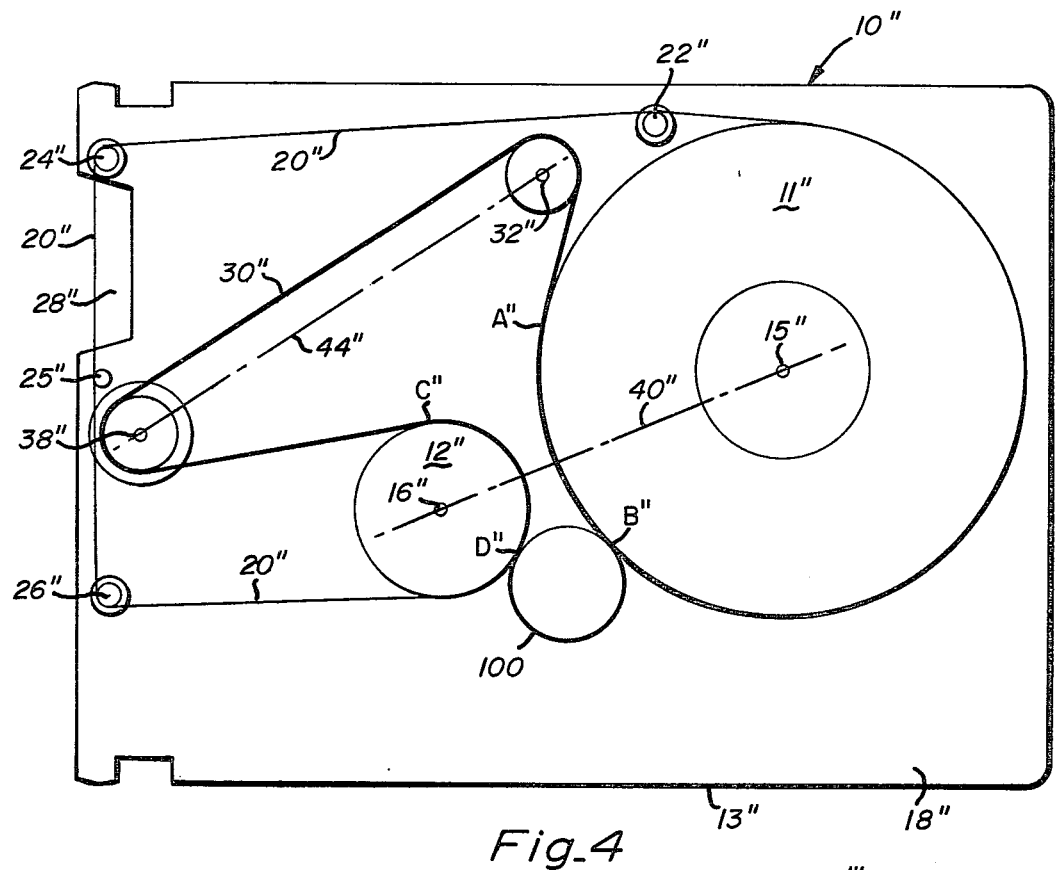
FIG. 4 is a plan view of another alternative embodiment of the cartridge of the present invention.

Referring to FIG. 1, a perspective view of the improved tape cartridge of the present invention, referred to by the general reference character 10, is shown being inserted into a suitably adapted tape drive referred to by the general reference character 50. Tape cartridge 10 houses a pair of tape packs 11 and 12. The cartridge 10 is received by the tape drive 50 along a pair of tracks 52 which cradle both sides of a housing 13 of the tape cartridge 10. A frontal face 14 of the tape cartridge 10 is designed in conformance with a standard configuration so that the tape drive 50 will properly receive the tape cartridge 10. In order for the tape cartridge 10 to become fully operative with the tape drive 50, a door 53 is cammed open by a cam 54. Once the door 53 is open, the tape cartridge 10 slides rearward along the tracks 52 so that a tape recording and reproducing head 56 of the drive 50 contacts a magnetic tape within the cartridge 10. Substantially concurrent with contact of the tape head 56 with the magnetic tape, a driving roller 58 of the drive 50 contacts a driven roller within the tape cartridge 10 to impart appropriate rotation of the tape packs 11 and 12. When the tape cartridge 10 is fully seated within the tape drive 50, the housing 13 of the tape cartridge 10 extends beyond an edge 60 of the drive 50. For most tape drives utilizing a cartridge with standard geometry for the frontal face 14, extended cartridge length outside the housing of the tape drive presents no functional difficulty.

Referring to FIGS. 1 and 2, the tape packs 11 and 12 are mounted for rotation within the housing 13 about a pair of parallel pivots 15 and 16, respectively. Pivots 15 and 16 are rigidly mounted perpendicular to a baseplate 18 serving as the main tape cartridge structural support. A web in the form of a magnetic recording tape 20 forms a loop passing from pack 11, over a set of four stationary guides 22, 24, 25, and 26 to the pack 12. In the loop path of the magnetic recording tape 20 from reel 11 to reel 12, the tape 20 passes through a space 28. The frontal face 14 of the cartridge is substantially perpendicular to the baseplate 18.

An endless drive belt 30, constructed of an elastic, resilient material drives the reels 11 and 12. The belt assumes a path formed by a set of four rollers 32, 34, 36 and 38. The belt 30 is maintained in tension when the drive belt is placed over the rollers 32, 34, 36, and 38. Driven roller 38 functions, in a manner similar to the prior art, as the driven roller for the cartridge and interfaces with the driving roller 58 of the tape drive 50. Drive belt 30 wraps about an arcuate portion of the tape reel 11 from point A to point B (FIG. 2), and about an arcuate portion of tape pack 12 from point C to point D (FIG. 2). Depending upon the amount of tape 20 wound upon each of the two packs 11 and 12, the angle of wrap of drive belt 30 on the tape packs 11 and 12 varies. The degree of tape wrap of belt 30 represented by arc AB on pack 11 and arc CD on pack 12 is not critical. It is only required that belt 30 drive tape packs 11 and 12 reliably without slippage, and it is also required that the drive belt 30 in conjunction with rollers 32, 34, and 36 never inadvertently interfere with the tape reels other than its intended contact over arcs AB and CD. For example, the roller 36 cannot be positioned so that drive belt 30 ever contacts tape pack 11 in its path from the point D to roller 36.

FIG. 2 illustrates two conditions of the tape 20 when it is substantially fully wound on each of the reels. The drawing illustrates the tape 20 by a solid line when substantially all of the tape 20 is wound up on reel 11. As illustrated by that solid line the diameter of the tape pack 11 is maximum at that point and the diameter of the tape pack 12 is minimum. When substantially all of the tape 20 is transported to the pack 12, then the diameter of the tape pack 12 is maximum and that of the tape pack 11 is minimum. This is illustrated by the broken line 20. Under no condition during the transport of the tape from pack to pack do the tape packs 11 and 12 in fact contact each other.

As discussed above, when the tape cartridge 10 is inserted within a suitably adapted tape drive 50, driven roller 38 contacts driving roller 58. In addition, the magnetic recording/reproducing head 56 enters the space 28 to make interface contact with the magnetic recording tape 20. When the driven roller 38 begins to move in contact with driving roller 58, the drive belt 30 likewise moves in a non-slip fashion. When drive belt 30 moves, it causes packs 11 and 12 to rotate. Depending upon the direction of rotation of the driven roller 38, one reel serves as a supply pack and the other pack serves as the take-up pack. The elastic belt 30 properly tensions the tape through the tape-belt interface contact over arcs AB and CD of packs 11 and 12, respectively. The contact of drive belt 30 with the tape on packs 11 and 12 is without slippage so that the tape 20 moves in a constant, uniform velocity.

The improved tape cartridge 10 dimension extending perpendicular to the plane of the frontal face 14 of tape cartridge 10 is significantly greater than the comparable length of a standard tape cartridge of the prior art. The alignment of the axes of rotation of the packs 11, 12 as illustrated by a line 40 in FIG. 2, is such that line 40 is at an acute angle relative to the frontal face 14 of tape cartridge 10. Also, the alignment of the roller 34 with roller 36 and roller 32 with roller 38, as illustrated by a pair of lines 42 and 44, is such that lines 42 and 44 are at acute angles relative to the cartridge frontal face 14. This configuration allows for substantially larger tape packs 11 and 12 compared to prior art cartridges. At the same time the cartridge 10 is compatible with existing tape drives since there are commonly no length restraints on cartridges for present tape drives. Thus, the improved tape cartridge 10 will simply extend from such a tape drive without functional difficulty.

As an alternative embodiment not illustrated in the drawings, a mirror image tape cartridge is possible instead of the preferred embodiment of FIG. 2. That is, a line drawn between the axes of rotation of the tape packs 11 and 12 in the mirror image cartridge would make an angle with the frontal face 14 of said mirror image cartridge that would substantially be 180° less the acute angle made by the intersection of line 40 with frontal face 14.

A further alternative embodiment of the present invention is illustrated in FIG. 3. Components of the embodiment of FIG. 3 similar to components of FIGS. 1 and 2 carry the same reference number distinguished by a prime designation. The alternative embodiment tape cartridge 10' has the magnetic tape 20' wound upon two tape packs 11' and 12'. Tape 20' is arranged in a loop from tape pack 11' tensioned over guides 22', 24', 25', and 26' and then wound upon pack 12'. Between guides 24' and 25' is the opening 28' adapted to receive a magnetic recording head of the tape drive (not shown in FIG. 3, but similar to reference character 56 of FIG. 1). FIG. 3 is shown with most of the magnetic tape 20' wound upon tape pack 12'.

A belt drive 30' is adapted to travel a path between driver roller 38' and a set of rollers 45, 46, 47, and 48. In the path of said drive belt 30', drive belt 30' makes interfacing contact with pack 11' over arc A'B' and with pack 12' over arc C'D'. In comparison with the preferred embodiment 10 illustrated in FIG. 2, five rollers are required to arrange the path of drive belt 30' so that said drive belt does not interfere improperly with the tape motion.

By utilizing the alternative embodiment of FIG. 3, a tape cartridge may be constructed so that the straight line 40' drawn through the axes of rotation of tape packs 11' and 12' is perpendicular with frontal face 14' of tape cartridge 10'. In addition, a line 62 drawn through the axes of rotation of rollers 47 and 48 generally makes a perpendicular with frontal face 14' of cartridge 10'. In embodiment 10', the overall perpendicular dimension of the cartridge measured from frontal face 14' need not be longer than that of the embodiment 10 described in connection with FIG. 2 while maintaining comparable tape capacity. Thus, tape cartridges 10 and 10' represent implementation of an improved tape cartridge embodying approximately a threefold increase in tape capacity over the prior art using similar tape.

A further embodiment of the present invention is shown in FIG. 4 and referred to by the general reference character 10". Components of the embodiment 10" that are comparable to the cartridge components of FIGS. 1 and 2 are indicated by a double prime designation. The tape cartridge 10" is designed to be tape drive interface compatible along frontal face 14" and the disposition of tape packs 11" and 12" and driven roller 38" is similar to that of tape cartridge 10. Moreover, the tape path of tape 20" over guides 22", 24", 25", and 26" is similar to tape cartridge 10. However, tape cartridge 10" utilizes a floating roller 100 about which is wrapped endless drive belt 30". Floating roller 100 is held in intimate contact with packs 11" and 12" by the tension upon drive belt 30". In this manner drive belt 30" imparts rotation to packs 11" and 12" through contact with said reels over arcs A"B" and C"D", respectively. Drive belt 30" is urged to turn packs 11" and 12" through contact with driven roller 38" which contacts a driving roller within the tape cartridge drive (not shown but similar to driving roller 58 of FIG. 1). Thus, drive belt 30" makes an endless loop over floating roller 100, driven roller 38" and a roller 32" (similar to roller 32 of cartridge 10). Similar to the cartridge 10, a line 40" drawn through the axes of rotation of packs 11" and 12" makes an acute angle with frontal face 14", as does line 44" intersecting the axis of rotation of the rollers 32" and 38".

Figure 5:
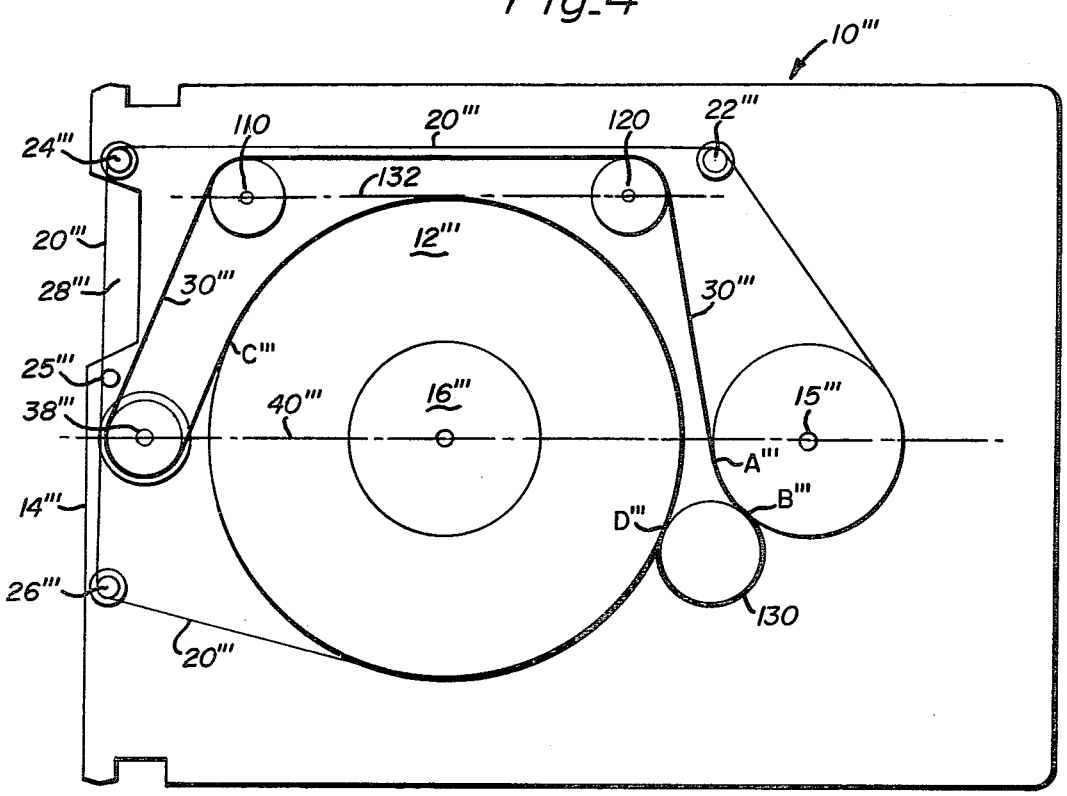
FIG. 5 is a plan view of a further embodiment of the cartridge of the present invention.

Yet another alternative embodiment, referred to by the general reference character 10''', of the tape cartridge of the present invention is shown in FIG. 5. The components of FIG. 5 that are comparable to the components of the cartridge 10 of FIGS. 1 and 2 are indicated with a triple prime designation. In FIG. 5, tape packs 11''' and 12''' of cartridge 10 rotate upon pivots 15''' and 16''', respectively. Tape 20''' is wound between packs 11''' and 12''' and makes a path over guides 22''', 24''', 25''', and 26'''. The tape 20''' passes through opening 28''' adapted to receive a magnetic recording/reproducing head (not shown but similar to reference character 56 of FIG. 1). A drive belt 30''' is wound about a drive roller 38''' in order to impart motion to said drive belt 30'''. The drive belt further wraps about a pair of rollers 110 and 120 which are similar to rollers 45 and 46, respectively, of FIG. 3 and completes an endless path wrapping over a floating foller 130 similar to floating roller 100 of FIG. 4. A straight line 40''' drawn through the axes of rotation of packs 11''' and 12''' makes a perpendicular with frontal face 14''' of cartridge 10'''. Moreover, a line 132 through the axes of rotation of rollers 112 and 120 generally makes a perpendicular with the plane of frontal face 14''' of cartridge 10'''. In this manner, the overall perpendicular dimension of the cartridge measured from the frontal face 14''' need be no longer in this embodiment than the other embodiments described herein, but the use of floating roller 130 is contemplated and the advantage of approximately threefold increase in cartridge storage capacity is realized.

While for the sake of clarity, and in order to disclose the invention so that the same can be readily understood, a specific embodiment has been described and illustrated, it is to be understood that the present invention is not limited to the specific means disclosed. It may be embodied in other ways including reverse plans that will suggest themselves to persons skilled in the art. It is believed that this invention is new and that all such changes that come within the scope of the following claims are to be considered as part of this invention.

What is claimed is:

1. A tape cartridge comprising:

a cartridge housing for interfacing with a tape cartridge drive, the cartridge having a front planar face with an opening for receiving a recording/reproducing head and a baseplate which is substantially perpendicular to the front face;

a first tape pack and a second tape pack, the first and second tape packs each rotatably mounted in the housing about a first and second fixed axis of rotation, respectively, with a tape web attached at one end to the first tape pack and at the other end to the second tape pack, the first and second axes of rotation being substantially perpendicular to said baseplate, the first and second packs being positioned with the first axis of rotation aligned laterally relative to the second axis of rotation with a straight line projecting through the first and second axes of rotation intersecting the plane of the front face at an acute angle;

a plurality of guide means rigidly mounted to the cartridge housing and positioned to guide said tape web when moving intermediate the first and second reels and past said opening to contact said head, said plurality of guide means including a first guide located in a corner of said tape cartridge adjacent to said front face of said cartridge housing and adjacent to said opening in said cartridge, a second guide located adjacent to said front face of said tape cartridge and adjacent to said opening in said cartridge on the opposite side of said opening from said first guide, a third guide located generally in a corner of said tape cartridge adjacent to said front face of said first guide, and a fourth guide located along an edge of said tape cartridge generally positioned such that a line drawn through said first and said fourth guide extends perpendicular with said front face of said cartridge;

an endless drive belt constructed of a flexible elastic material;

a plurality of rollers over which the belt is wrapped, the rollers being positioned such that the belt forms at least two arcuate portions passing between and engaging the first and second tape pack;

said plurality of rollers includes a first driven roller adapted to contact a driving roller of a suitable tape drive when said tape cartridge is inserted therewithin, a second roller located such that a line drawn through the axes of rotation of said second roller and said first driven roller forms an acute angle with said front face of said tape cartridge opposite from said second roller at a distance less than the perpendicular distance from the axis of rotation of said first tape pack to said front face of said cartridge but greater than the perpendicular distance from said second tape pack to said front face of said tape cartridge, and a fourth roller located generally along the rear edge of said cartridge housing opposite from said front face of said cartridge housing and generally in a corner diagonally opposite from said first tape guide.

2. The tape cartridge of claim 1 wherein,
   said fourth guide is located at a distance from said front face of said tape cartridge that is less than the distance of the axis of rotation of said first tape pack to said front face of said cartridge but greater than the distance of the axis of rotation of said second tape pack to said front face of said cartridge.

3. The tape cartridge of claim 2 further comprising:
   a plurality of pivots each rigidly affixed to said cartridge housing upon which each of said plurality of rollers individually rotates.

4. The tape cartridge of claim 2 or 3 wherein,
   the angle of wrap contact between said drive belt and said first tape pack and between said drive belt and said second tape pack is generally sufficient to drive said tape pack in a non-slip fashion for all conditions of operation of said tape cartridge upon rotation of said first driven roller.

5. The tape cartridge of claim 1, 2 or 3 wherein,
   the line drawn through the axis of rotation of said first drive roller and the axis of said second roller, the line drawn through the axes of rotation of said first and second tape packs, and the line drawn through the axes of rotation of said third and fourth rollers are all substantially parallel.

6. The tape cartridge of claim 2 wherein said plurality of rollers includes,
   a first driven roller rotatably mounted to a pivot rigidly affixed to said cartridge housing adapted to contact a driving roller of a suitable tape drive when said tape cartridge is inserted therewithin,
   a second roller rotatably mounted to a pivot rigidly affixed to said cartridge housing located such that a line drawn through the axes of rotation of said second roller and said first driven roller forms an acute angle with said front face of said tape cartridge, and
   a floating roller urged by said drive belt toward said tape reels for squeezing said drive belt between said floating roller and said tape packs with the axis of rotation of said floating roller located on the opposite side of the line drawn through the axes of rotation of said first and second tape packs from said first driven roller and said second roller.

7. The tape cartridge of claim 6 wherein,
   the angle of wrap contact between said drive belt and said first tape pack and between said drive belt and said second tape pack is generally sufficient to drive said tape packs in a non-slip fashion for all conditions of operation of said tape cartridge upon rotation of said first driven roller.

8. A tape cartridge comprising:
   a cartridge housing for interfacing with a tape cartridge drive, the cartridge having a front planar face with an opening for receiving a recording/reproducing head and a baseplate which is substantially perpendicular to the front face;
   a first tape pack and a second tape pack, the first and second tape packs each rotatably mounted in the housing about a first and second fixed axis of rotation, respectively, with a tape web attached at one end to the first tape pack and at the other end to the second tape pack, the first and second axes of rotation being substantially perpendicular to said baseplate, the first and second packs being positioned with the first axis of rotation aligned laterally relative to the second axis of rotation with a straight line projected through the axes or rotation of said first and second tape packs at a perpendicular with respect to said plane of said front face;
   a plurality of guide means rigidly mounted to the cartridge housing and positioned to guide said tape web when moving intermediate the first and second reels and past said opening to contact said head;

an endless drive belt constructed of a flexible elastic material; and a plurality of rollers over which the belt is wrapped, the rollers being positioned such that the belt forms at least two arcuate portions passing between and engaging the first and second tape pack.

9. The tape cartridge of claim 8 wherein said plurality of guide means comprises:

a first guide located in a corner of said tape cartridge adjacent to said front face of said cartridge housing and adjacent to said opening in said cartridge, a second guide located adjacent to said front face of said tape cartridge and adjacent to said opening in said cartridge on the opposite side of said opening from said first guide, a third guide located generally in a corner of said tape cartridge adjacent to said front face of said cartridge housing on the side of said cartridge opposite from said first guide, and a fourth guide located along an edge of said tape cartridge generally positioned such that a line drawn through said first guide and said fourth guide extends perpendicular with said front face of said cartridge.

10. The tape cartridge of claim 9 wherein, said fourth guide is located at a distance from said front face of said tape cartridge that is less than the distance of the axis of rotation of said first tape pack to said front face of said tape cartridge but greater than the distance of the axis of rotation of said second tape pack to said front face of said tape cartridge.

11. The tape cartridge of claim 10 further comprising:

a plurality of pivots each rigidly affixed to said cartridge housing upon which each of said plurality of rollers individually rotates.

12. The tape cartridge of claims 9, 10, or 11 wherein said plurality of rollers includes:

a first driven roller adapted to contact a driving roller of a suitable tape drive when said tape cartridge is inserted therewithin, a second roller located such that a line drawn through the axes of rotation of said second roller and said first driver roller forms an acute angle with said front face of said cartridge, a third roller located at a distance generally greater than the perpendicular distance from the axis of rotation of said second tape pack to the front face of said tape cartridge but less than the perpendicular distance from the axis of rotation of said first tape pack to said front face of said cartridge and located such that a line drawn through the axes of rotation of said third roller and said first driver roller forms an acute angle with said front face of said cartridge, a fourth roller located adjacent to an edge of said tape cartridge opposite from said second and third rollers at a distance less than the perpendicular distance from the axis of rotation of said first tape pack to said front face of said tape cartridge but greater than the perpendicular distance from the axis of rotation of said second tape pack to said front face of said tape cartridge; and a fifth roller located generally along the rear edge of said tape cartridge housing opposite from said front face of said tape cartridge and generally in a corner diagonally opposite from said first tape guide.

13. The tape cartridge of claim 12 wherein, the angle of wrap contact between said drive belt and said first tape pack and between said drive belt and said second tape pack is generally sufficient to drive said tape reels in a non-slip fashion for all conditions of operation of said tape cartridge upon rotation of said first driven roller.

14. The tape cartridge of claim 13 wherein, a line drawn through said first and fourth tape guides, a line drawn through the axes of rotation of said first and second tape packs, and a line drawn through the axes of rotation of said second and third rollers, and a line drawn through the axes of rotation of said fourth and fifth rollers all generally form a perpendicular with the plane of the front face of said tape cartridge.

15. The tape cartridge of claim 10 wherein said plurality of rollers includes:

a first driven roller rotatably mounted to a pivot rigidly affixed to said cartridge housing adapted to contact a driving roller of a suitable tape drive when said tape cartridge is inserted therewithin, a second roller rotatably mounted to a pivot rigidly affixed to said cartridge housing located such that a line drawn through the axes of rotation of said first driven roller and said second roller is at an acute angle with said front face of said tape cartridge and located generally at a distance less than the perpendicular distance of the axis of rotation of, said second tape pack to said front face of said tape cartridge, a third roller rotatably mounted to a pivot rigidly affixed to said cartridge housing located such that a line drawn through the axes of rotation of said first driven roller and said third roller is at an acute angle with said front face of said tape cartridge and located generally at a distance greater than the perpendicular distance from the axis of rotation of said second tape pack to said front face of said cartridge but less than the perpendicular distance from the axis of rotation of said first tape pack to said front face of said tape cartridge, and a floating roller urged by said drive belt toward said tape packs for squeezing said drive belt between said floating roller and said tape packs with the axis of rotation of, said floating roller located on the opposite side of the line drawn through the axes of rotation of said first and second tape packs from said other rollers.

16. The tape cartridge of claim 15 wherein, the angle of wrap contact between said drive belt and said first tape pack and between said drive belt and said second tape pack is generally sufficient to drive said tape packs in a non-slip fashion for all conditions of operation of said tape cartridge upon rotation of said first driven roller.

17. A tape cartridge comprising:

a cartridge housing for interfacing with a tape cartridge drive, the cartridge having a front planar face with an opening for receiving a recording/reproducing head and a baseplate which is substantially perpendicular to said front face;

a first tape pack and a second tape pack, the first and second tape packs each rotatably mounted in the housing about a first and second fixed axis of rotation, respectively, with a tape web attached at one end to the first tape pack and at the other end to the second tape pack, said first and second fixed axes of rotation being substantially perpendicular to said baseplate, said second fixed axis of rotation being located intermediate said first fixed axis of rotation and said plane of said front face along a line segment extending parallel to said baseplate passing through said first fixed axis of rotation and said plane of said front face;

a plurality of guide means rigidly mounted to the cartridge housing and positioned to guide said tape web along a path between the first and second tape packs which path passes through said opening in said front planar face for receiving a recording/reproducing head;

an endless drive belt constructed of a flexible, elastic material; and a plurality of rollers around which the endless drive belt is wrapped, each roller being secured to the cartridge housing so as to be rotatable about an axis disposed substantially parallel to said first and second axes of rotation of the tape packs, the rollers being positioned such that the path of the belt around the rollers has at least two arcuate portions passing around and engaging said outside tape web on the first and second tape packs, the angle of wrap contact between the drive belt and the first tape pack and between the drive belt and the second tape pack being sufficient to drive the tape packs in a non-slip fashion, the plurality of rollers including a first driven roller adapted to contact a driving roller of a suitable tape drive when the tape cartridge is inserted therewithin, a second roller having said axis of rotation not on a side of a plane passing through said first and second fixed axes of rotation of the tape packs opposite to that of said axis of the first driven roller, and a third roller having said axis of rotation on said side of said plane passing through said first and second fixed axes of rotation of the tape packs opposite to that of the second roller.

18. The tape cartridge of claim 17 wherein,
said axis of rotation of the second roller is located, at a distance from said plane of said front face which is no greater than the distance of said first fixed axis of rotation of the first tape pack from said plane of said front face.

19. The tape cartridge of claim 15 wherein,
the plurality of rollers includes a fourth roller having said axis of rotation on said same side of said plane passing through said first and second fixed axes of rotation of the tape packs as the second roller.

20. The tape cartridge of claim 19 wherein,
said axis of rotation of the fourth roller is located at a distance from said plane of said front face which is no greater than the distance of said second fixed axis of rotation of the second tape pack from said plane of said front face.

21. The tape cartridge of claim 19 wherein,
a plane passing through said axes of rotation of the second and fourth roller is substantially parallel to said plane passing through said first and second fixed axes of rotation of the tape packs.

22. The tape cartridge of claim 17 or 19 further comprising:
a plurality of pivots one fewer in number than the plurality of rollers, each pivot being rigidly affixed to said cartridge housing, the first driven roller and all other rollers except one being mounted to individually rotate on the pivots, the remaining unmounted roller being a floating roller which is urged by said endless drive belt toward the first and second tape packs.

23. The tape cartridge of claim 17 wherein,
a plane passing through said axes of rotation of the first driven roller and the second roller is substantially parallel to said plane passing through said first and second fixed axes of rotation of the tape packs.

24. The tape cartridge of claim 17 or 19 wherein,
the plurality of rollers includes an additional roller having said axis of rotation on said same side of said plane passing through said first and second fixed axes of rotation of the tape packs as the third roller.

25. The tape cartridge of claim 24 wherein,
a plane passing through said axes of rotation of the third roller and the additional roller is substantially parallel to said plane passing through said first and second fixed axes of rotation of the tape packs.

26. The tape cartridge of claim 25 further comprising:
a plurality of pivots each rigidly affixed to said cartridge housing upon which each of said plurality of rollers individually rotates.

27. The tape cartridge of claim 17 wherein said plurality of guide means comprises:
a first guide located in a corner of said tape cartridge adjacent to said front face of said cartridge housing and adjacent to said opening in said cartridge,
a second guide located adjacent to said front face of said tape cartridge and adjacent to said opening in said cartridge on the opposite side of said opening from said first guide,
a third guide located generally in a corner of said tape cartridge adjacent to said front face of said cartridge housing on the side of said cartridge opposite from said first guide, and
a fourth guide located along an edge of said tape cartridge generally positioned such that a line drawn through said first guide and said fourth guide extends perpendicular with said front face of said cartridge.

28. The tape cartridge of claim 27 wherein,
said fourth guide is located at a distance from said front face of said tape cartridge that is less than the distance of the axis of rotation of said first tape pack to said front face of said cartridge but greater than the distance of the axis of rotation of said second tape pack to said front face of said cartridge.

29. The tape cartridge of claim 17 further comprising:
a plurality of pivots each rigidly affixed to said cartridge housing upon which each of said plurality of rollers individually rotates.

30. The tape cartridge of claim 17 wherein,
said straight line projecting through the axes of rotation of said first and second tape packs is at a perpendicular with respect to said plane of said front face.

* * * * *